United States Patent [19]

Murdoch

[11] 3,917,361
[45] Nov. 4, 1975

[54] FRICTION BEARING
[75] Inventor: Henry W. Murdoch, Houston, Tex.
[73] Assignee: Reed Tool Company, Houston, Tex.
[22] Filed: Jan. 30, 1974
[21] Appl. No.: 437,897

[52] U.S. Cl. ............. 308/8.2; 308/DIG. 4; 175/372
[51] Int. Cl.² ......................................... F16C 19/00
[58] Field of Search ............. 175/372, 371; 308/8.2, 308/DIG. 4

[56] References Cited
UNITED STATES PATENTS

| | | |
|---|---|---|
| 2,104,819 | 1/1938 | Schlumpf et al. ............. 308/8.2 UX |
| 3,056,637 | 10/1962 | Shanley et al. ................ 308/DIG. 4 |
| 3,721,307 | 3/1973 | Mayo ................................ 308/8.2 X |

*Primary Examiner*—M. Henson Wood, Jr.
*Assistant Examiner*—Gene A. Church
*Attorney, Agent, or Firm*—Jack R. Springgate; Joe E. Edwards; M. H. Gay

[57] ABSTRACT

A friction bearing, particularly useful in drill bits, including a split, floating, flexible bushing.

12 Claims, 7 Drawing Figures

FRICTION BEARING

BACKGROUND OF THE INVENTION

This invention relates to improved friction bearings of large load capacity for roller drill bits.

Some prior drill bit friction bearings have been subject to galling, breaking up or seizing, which can result in relatively short bearing life.

SUMMARY

This invention is concerned with a new and improved friction bearing for roller drill bits which comprises a split, floating bushing or sleeve, preferably having a low coefficient of friction, which provides a large load capacity bearing which is not likely to break, gall or seize during the drilling operation.

While described here in connection with roller drill bits, it is apparent that the bearing of the invention can be used in other machinery or equipment employing relatively rotatable members.

DESCRIPTION OF THE PREFERRED EMBODIMENT

Figure 1:
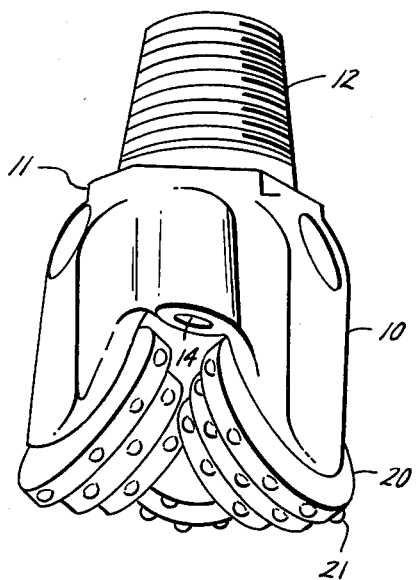
FIG. 1 is a side elevational view of a roller cutter type earth drilling bit.
Figure 2:
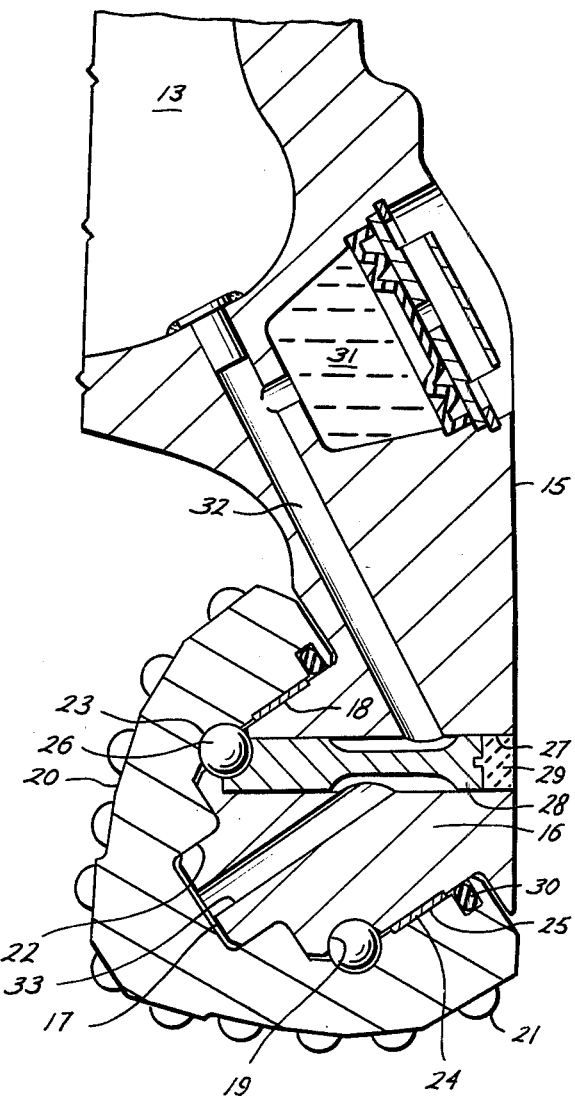
FIG. 2 is a partial, detailed sectional view of the drill bit showing its bearing structure.

Referring to FIGS. 1 and 2, an earth boring drill is shown generally at 10 comprising a steel head 11 having a threaded shank 12 extending upwardly and adapted to be threadedly connected to the lower end of a drill stem (not shown). The head 11 has a chamber 13 and a nozzle 14 to receive and discharge drilling fluid pumped downwardly through the drill stem in the usual manner. Steel legs 15 depend from head 11 and each has an inwardly and downwardly extending bearing shaft 16. A bearing pin 17 may be provided on the shaft 16. A ball race 19 is located on the shaft 16 between the pin 17 and the cylindrical portion 18.

A steel cutter 20, having cutting elements 21 such as tungsten carbide inserts, surrounds the shaft 16 and has a friction race 22 engaging the pin 17, and a ball race 23 which is complementary to the race 19 on the shaft 16. A bearing bushing or sleeve 24 is positioned on the cylindrical portion 18. The cutter 20 has a friction race 25 engaging the bearing bushing 24.

Ball bearings 26 are inserted into the ball races 19 and 23 through bore 27 in the shaft 16, and a ball retaining plug 28 is secured in the bore 27 by welding as shown at 29. A grease seal 30 is provided between the cutter 20 and the shaft 16.

Lubrication is supplied to the interior of the cutter 20 from reservoir 31, through passageway 32, around the plug 28 and through passageway 33 in the shaft 16.

The bearing bushing 24 floats between the cylindrical portion 18 and the cutter race 25. The bushing 24 may be split or divided as shown at 40 in FIG. 6. In some applications it may be desirable to divide the bushing additionally as shown in dotted lines at 41.

Figure 5:
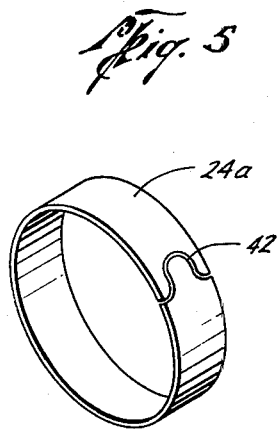
FIGS. 5, 6 and 7 are pictorial views of various embodiments of the friction bearing member.

FIG. 5 shows bearing bushing 24a which is divided as at 42 in an interlocking configuration so that in operation the ends of the bushing 24a cannot be displaced axially relative to each other.

Figure 6:
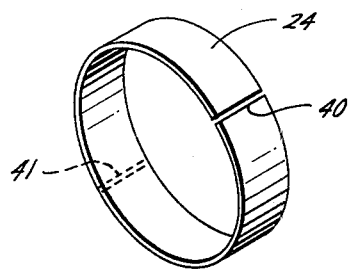

FIG. 6 shows bearing bushing 24b divided as at 43 in another interlocking configuration.

Figure 3:
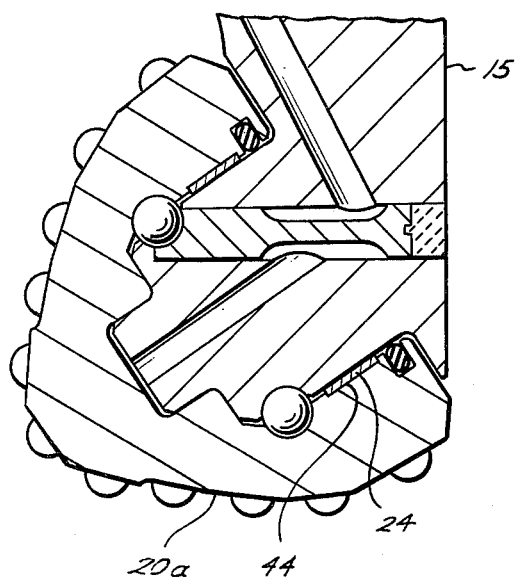
FIG. 3 is a sectional view showing another embodiment of the invention.

FIG. 3 shows another embodiment of the bearing bushing arrangement wherein cutter 20a has a groove 44 and bearing bushing 24 is disposed therein.

Figure 4:
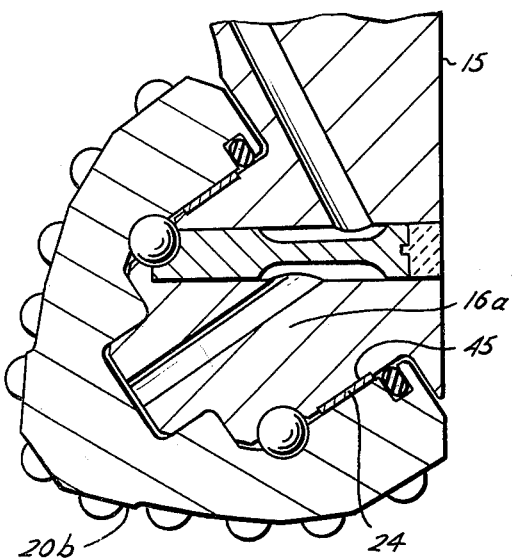
FIG. 4 is a sectional view showing still another embodiment of the invention.
Figure 7:
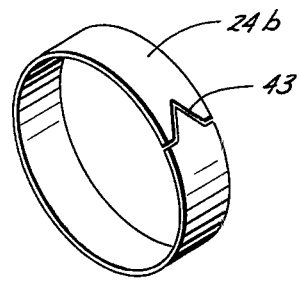

FIG. 4 is a view similar to FIG. 3 having a cutter 20b and a shaft 16a which has a groove 45 into which bearing bushing 24 is placed.

The bearing bushings 24, 24a and 24b all operate in a similar manner so that a description of one will describe the others.

The bearing bushing 24 is preferably made of non-ferrous material such as beryllium copper and is sufficiently thin so as to be flexible. For example, for a bushing having an inside diameter of approximately 2 inches, I have found that a bushing thickness of approximately thirty five thousandths of an inch is satisfactory in operation.

It is important that the bushing 24 be sufficiently thin to be flexible. That is, the bushing must be capable of being bent in operation without breaking. I prefer that the bushing thickness be no greater than approximately one sixteenth inch per inch of inside diameter of the bushing.

The bushing 24 is split or divided as shown at 40 in FIG. 6. The space thus resulting between the confronting ends of the bushing is made to be sufficient to accommodate circumferential growth of the bushing occasioned by operational frictional heat and plastic deformation of the bushing to prevent seizure of the bushing in the cutter. I have found an end space of approximately 0.015 to 0.035 inch to be sufficient.

Some prior drill bit friction bearing bushings made of relatively thick carburized steel are believed to break up in operation because such carburized bushings are not sufficiently flexible. When such failures occur, the cutter becomes extremely loose on the shaft and may be lost from the drill bit; whereas, in the present invention, even if the bushing is worn out or destroyed the cutter is still relatively tight on the shaft since the bushing is relatively thin and occupies correspondingly less space.

If friction bearing bushings are made in a solid ring (not split), then sufficient diametral clearance must be provided between the shaft and bushing and between the bushing and cutter to allow for operational heat growth and plastic deformation of the bushing to prevent the bushing from seizing in the cutter. With my invention, the diametral clearances may be made extremely small since the space between the confronting ends of the bushing will accommodate such operational growth.

Also, the bushing of the invention may be made from rolled sheet material the thickness of which may be maintained to plus or minus 0.0005 inch or less from the design desired thickness. Thus the cutter may fit very tightly over the bushing and shaft to provide a superior and economical friction bearing for a roller drill bit. Such bushing is not unlike a flexible band in that it conforms (but does not break) to the shapes of the parts associated with it when it is stressed during the drilling operation.

As previously stated, the bearing bushing 24 is preferably made of a non-ferrous material; however, the bushing may be made of other metals and have plated thereon a softer material such as silver. I have found to be satisfactory in use a beryllium copper bushing comprising mainly copper, 1.80 to 2.05 percent beryllium with lesser amounts of cobalt, nickel and iron. Such material may have a modulus of elasticity of approximately 18,500,000 and may be solution annealed and age hardened to a tensile strength of 165,000 to 190,000 PSI having a Rockwell C hardness of from 36 to 42.

The bushing 24 is a floating bushing. That is, the bushing is not attached to the shaft or cutter but is free to rotate at random with respect to the shaft or the cutter. Such bearing structure is economical to manufacture, permits extremely small diametral clearances resulting in a superior friction bearing capable of withstanding heavy loads and affording improved seal life because of reduced radial excursion of the cutter with respect to the shaft.

The foregoing disclosure and description of the invention are illustrative and explanatory thereof, and various changes in the size, shape and materials, as well as in the details of the illustrated constructions, may be made within the scope of the appended claims without departing from the spirit of the invention.

What is claimed is:

1. An earth drilling bit comprising:
   a head,
   at least one bearing shaft on said head,
   a cutter rotatably mounted on said shaft,
   a metallic bearing bushing between said shaft and cutter,
   the said bushing being divided whereby a space is provided between confronting ends of the bushing to accomodate any circumferential growth of the bushing, occasioned by operational frictional heat and plastic deformation of the bushing, to prevent seizure of the bushing in the cutter,
   the thickness of the bushing being no greater than approximately one sixteenth inch per inch of inside diameter of the bushing so that the bushing is flexible.

2. An earth drilling bit according to claim 1 wherein the bushing floats between the shaft and the cutter.

3. An earth drilling bit according to claim 1 wherein the bushing comprises beryllium copper.

4. An earth drilling bit according to claim 1 wherein the bushing comprises non-ferrous material.

5. An earth drilling bit according to claim 1 wherein a seal is provided between the cutter and shaft.

6. An earth drilling bit according to claim 1 wherein the cutter has a groove into which the bushing is disposed.

7. An earth drilling bit according to claim 1 wherein the shaft has a groove into which the bushing is disposed.

8. An earth drilling bit according to claim 1 wherein the bushing comprises a metallic material having a softer material plated thereon.

9. An earth drilling bit according to claim 1 wherein the bushing comprises two or more pieces.

10. An earth drilling bit according to claim 1 wherein the ends of the bushing are contoured so that they cannot be displaced axially relative to each other.

11. In an earth drilling bit having a head, a shaft on the head and a roller cutter on the shaft and a bearing bushing between said shaft and said cutter,
    the said bushing being divided whereby a space is provided to accommodate circumferential growth of the bushing, occasioned by operational frictional heat and plastic deformation of the bushing, to prevent seizure of the bushing in the cutter,
    the thickness of the bushing being no greater than approximately one sixteenth inch per inch of inside diameter of the bushing so that the bushing is flexible.

12. A friction bearing between a pair of relatively rotatable members comprising:
    a bearing bushing between said pair of relatively rotatable members,
    the said bushing being divided whereby a space is provided to accommodate circumferential growth of the bushing, occasioned by operational heat, to prevent seizure of the bushing to one of the said members,
    the thickness of the bushing being no greater than approximately one sixteenth inch per inch of inside diameter of the bushing so that the bushing is flexible.

* * * * *